Figure 1:
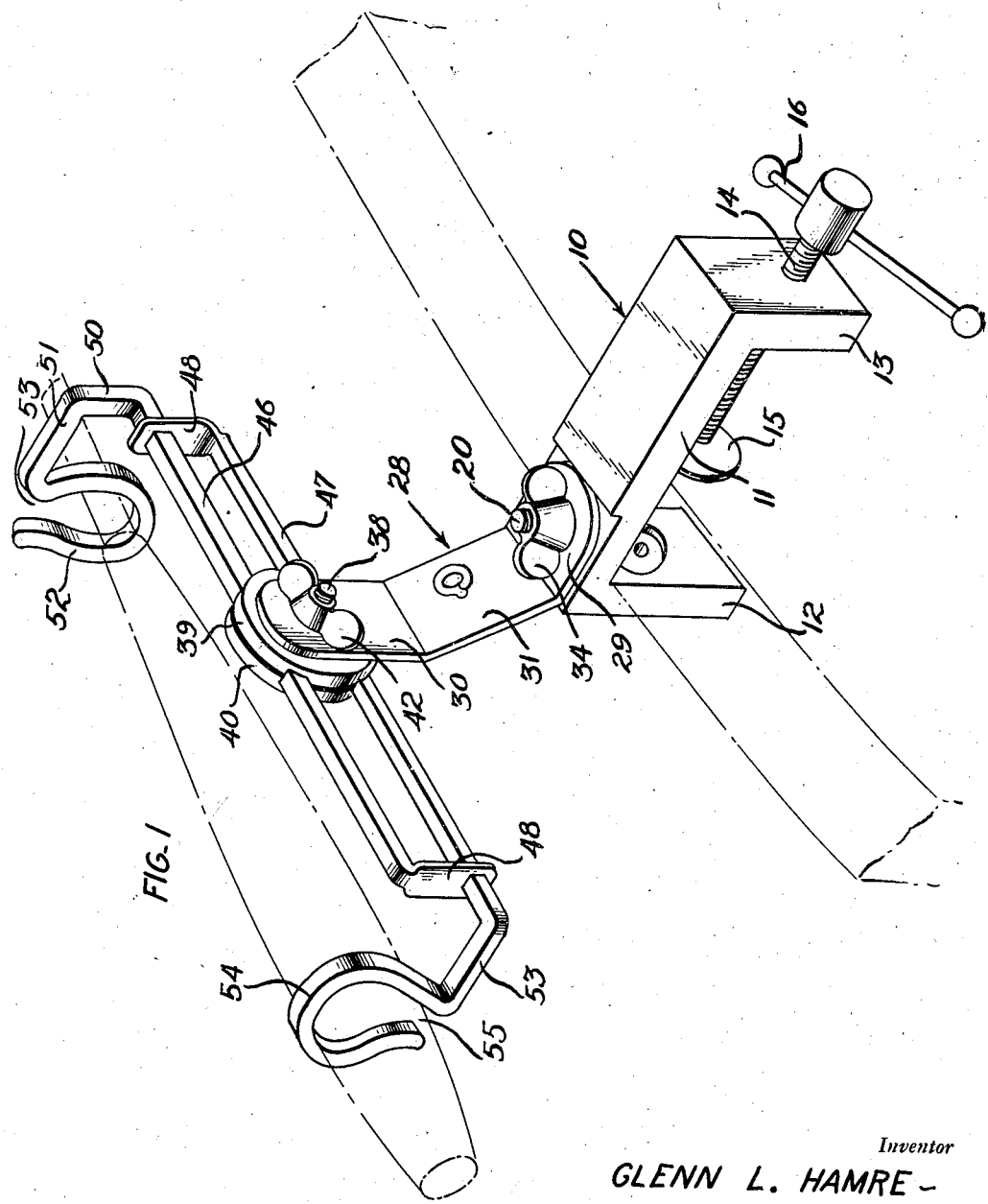

March 4, 1947.  G. L. HAMRE  2,416,828
FISHING ROD HOLDER AND FLY TYING VISE
Filed June 1, 1946  2 Sheets-Sheet 1

Inventor
GLENN L. HAMRE

By *Clarence A. O'Brien
and Harvey B. Jacobson*
Attorneys

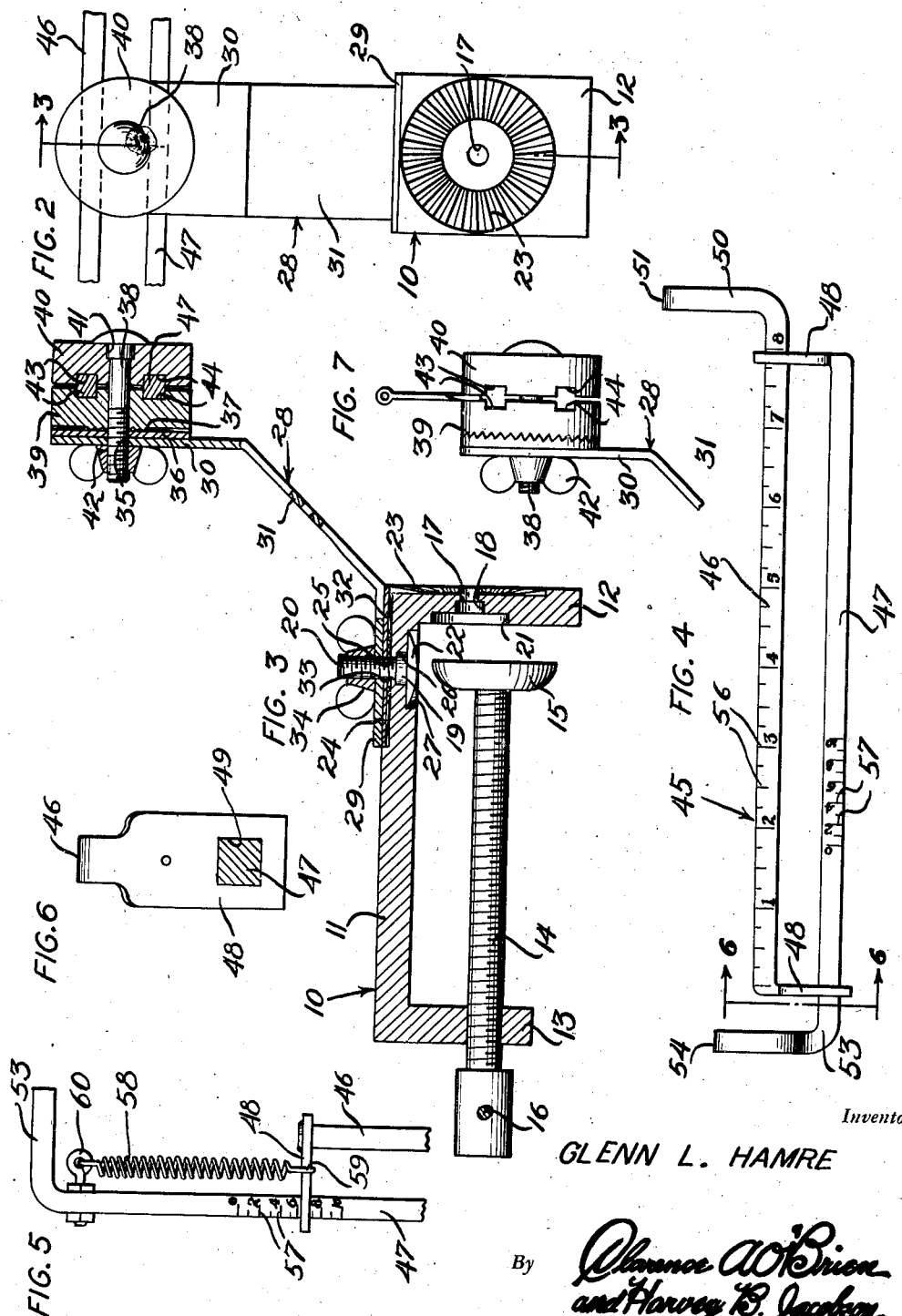

Patented Mar. 4, 1947

2,416,828

UNITED STATES PATENT OFFICE 2,416,828

FISHING ROD HOLDER AND FLY TYING VISE

Glenn L. Hamre, Billings, Mont.

Application June 1, 1946, Serial No. 673,756

2 Claims. (Cl. 248—42)

This invention relates to a fishing rod holder and fly tying vise and has for its primary object to sustain rods in proper positions on the side or stern of a boat during a fishing expedition.

Another object is to clamp a fish hook and securely hold it while tying flys or performing other operations thereon.

A further object is to facilitate the measuring and weighing of the fish which has been caught.

The above and other objects may be attained by employing this invention which embodies among its features a substantially U-shaped clamp bracket adapted to be clamped to a support, such as the work table or bench, or the gunwale or stern of the fishing boat, a bracket arm mounted for pivotal adjustment on said clamp bracket, and a pair of clamp plates mounted for pivotal adjustment on said arm about an axis perpendicular to the axis of the pivot connecting the arm to the bracket.

Other features include an adjustable cradle adapted to be clamped between the clamp plate, to support a fishing rod during a fishing expedition.

In the drawings:

Figure 1 is a perspective view of this improved fishing rod holder and fly tying vise illustrating its use as a fishing rod holder, Figure 2 is a fragmentary end view of this improved fishing rod holder and fly tying vise, Figure 3 is a vertical sectional view taken substantially along the line 3—3 of Figure 2, Figure 4 is a side view in elevation of my improved fishing rod supporting cradle showing the same modified for measuring the length of the caught fish, Figure 5 is a fragmentary view of the fishing rod holder illustrated in Figure 4 showing the same modified for weighing a fish which has been caught, Figure 6 is an enlarged sectional view taken substantially along the line 6—6 of Figure 4, and Figure 7 is a fragmentary side view of the device showing it in use for holding a fish hook.

Referring to the drawings in detail, a clamp bracket designated generally 10 comprises a substantially U-shaped body formed of a back 11 and depending legs 12 and 13. The leg 13 is provided with an internally screw threaded opening for the reception of a clamp screw 14 carrying at its inner end a clamp pad 15 and at its outer end a vise handle 16 by means of which the screw may be turned to advance the clamp pad 15 toward the leg 12 which forms a cooperating clamp jaw. Formed in the leg 12 is an opening 17, the inner end of which is countersunk as at 18 to form a rectangular seat for the rectangular neck 19 of a bolt 20, and formed adjacent the countersunk portion 18 in the countersink 21 for the reception of the bolt head 22. Formed on the outer face of the leg 12 and radiating from the axis of the opening 17 are serrations 23, the purpose of which will be more fully hereinafter explained. Formed on the outer face of the back 11 is a similar group of radial serrations 24 which radiate from the axis of an opening 25 which like the opening 17 is provided with a rectangular countersunk portion 26 and a bolt head countersink 27. A bracket arm designated generally 28 comprises a pair of tabs 29 and 30 which are arranged perpendicular to one another and connected by an angle portion 31. Each of these tabs is provided on one face with a serrated pad 32 which is pierced as at 33 to receive the bolt 20. A wing nut 34 is threaded on the bolt in order to clamp the bracket arm 28 in the desired position on the clamp bracket 10, previously referred to. The serrations of the pad 32 cooperate with the serrations 23 or 24 according to the position that the bracket arm 28 takes on the clamp bracket 10 as will be readily understood upon reference to the drawings. The perpendicular pad 30 is pierced as at 35 and carries a serrated pad 36 which is provided with a central opening from which serrations 37 radiate.

A bolt 38 extends through the opening 35 and through central openings formed in a pair of clamp plates 39 and 40, and formed on one face of the clamp plate 39 is a plurality of radial serrations which cooperate with the serrations 37 in holding the plate against rotation on the pad 36. Formed in the plate 40 is a rectangular countersink 41 for the reception of a square portion formed adjacent the head of the bolt 38 and a wing nut 42 is threaded on said bolt in order to draw the clamp plates 39 and 40 together, and clamp the plate 39 firmly against the pad 36. Each plate 39 and 40 is formed with spaced opposing grooves 43 and 44 which cooperate in holding the fishing rod supporting cradle to be more fully hereinafter explained.

The fishing rod supporting cradle above referred to is designated generally 45 and comprises a pair of spaced bars 46 and 47 preferably of rectangular or square stock, each of which is formed at one end with an angular extension 48 which is pierced with a rectangular opening 49 through which the opposite bar slides. Formed at the end of the bar 46 opposite that carrying the extension 48 is an upturned portion 50 carrying a laterally extending arm 51 which is provided at its free end with a hook 52, the mouth 53 of which opens upwardly. Formed at the end of the bar 47 opposite its angularly extending portion 48 is a horizontally extending arm 53 carrying at its end a hook 54, the mouth 55 of which opens downwardly. The hooks 52 and 54 align along an axis substantially parallel to the longitudinal axes of the bars 46 and 47 so that when a fishing rod is in place, as suggested in Figure 1, its longitudinal axis will lie substantially parallel to the longitudinal axes of the rods 46 and 47.

In order that the length of a caught fish may be determined, I find it advantageous to divide one of the bars 46 or 47 into inches and fractions thereof, as at 56 (Figure 4), and for the purpose of weighing a fish, I mark the opposite bar as at 57 with divisions indicating pounds and halves. Having so marked the bar 47, I provide a retractile coil spring 58, one end 59 of which may be hooked over the angular extension 48 on the bar 46, while its opposite end is attached to a suitable eye 60 carried by the bar 47 near the arm 53. By properly selecting the spring 58, it is obvious that when the device is turned in the position illustrated in Figure 5 and the spring 58 attached in place, a fish may be hung on the hook 52 and by elevating the device by the hook 54, the weight of the fish will be registered on the graduations or divisions 57.

When the device is in use to support a fishing rod, the rod holder designated generally 45 is supported in the clamp discs 39 and 40 as suggested in Figure 1 with the bars 46 received in the recesses 43 of the plates 39 and 40, and the bar 47 received in the recesses 44 of the clamp plates. By tightening the wing nut 42 on the bolt 38, it will be obvious that the serrations will mesh with one another so as to lock the fish rod holder 45 at the desired angle. The rod may then be inserted in the holder as suggested by the broken lines in Figure 1, it being understood that the bracket 10 is first clamped to the gunwale or stern transom of the fishing boat. When it is desired to use the device for tying flys or otherwise working on fish hooks the latter may be clamped between the clamp plates 39 and 40 as suggested in Figure 7, and the device attached to a work table or bench, by extracting the bolt 20 from the opening 25 and passing it through the opening 18 so that the bracket arm 28 may be caused to be clamped to the outer face of the leg 12 of the clamp bracket 11.

While in the foregoing there has been shown and described the preferred embodiment of this invention it is to be understood that minor changes in the details of construction, combination and arrangement of the parts may be resorted to without departing from the spirit and scope of the invention as claimed.

What I claim is:

1. A fishing rod holder and fly tying vise which includes a substantially U-shaped clamp bracket adapted to be clamped to a support, a bracket arm mounted for pivotal adjustment on said bracket and a pair of clamp plates mounted for pivotal adjustment on said arm about an axis perpendicular to the axis of the pivot connecting the arm to the bracket.

2. A fishing rod holder and fly tying vise which includes a substantially U-shaped clamp bracket adapted to be clamped to a support, a bracket arm mounted for pivotal adjustment on said bracket and a pair of clamp plates mounted for pivotal adjustment on said arm about an axis perpendicular to the axis of the pivot connecting the arm to the bracket, and a fishing rod supporting cradle adapted to be clamped between said clamp plates.

GLENN L. HAMRE.

REFERENCES CITED

The following references are of record in the file of this patent:

UNITED STATES PATENTS

| Number | Name | Date |
| --- | --- | --- |
| 2,220,234 | Hadaway | Nov. 5, 1940 |